United States Patent [19]

Deem

[11] 4,283,009
[45] Aug. 11, 1981

[54] CONTROL VALVE FOR FLUID-OPERATED CLUTCH

[75] Inventor: Brian C. Deem, Avon Lake, Ohio

[73] Assignee: The Bendix Corporation, Southfield, Mich.

[21] Appl. No.: 119,338

[22] Filed: Feb. 7, 1980

[51] Int. Cl.³ ............................................ G05D 23/12
[52] U.S. Cl. ................................... 236/86; 123/41.12; 137/625.69; 236/100
[58] Field of Search ............................ 236/38, 86, 100; 137/625.69, 625.65; 192/82 T; 123/41.04, 41.06, 41.12

[56] References Cited

U.S. PATENT DOCUMENTS

| | | | |
|---|---|---|---|
| 2,656,144 | 10/1953 | Frantz | 137/625.69 |
| 2,854,998 | 10/1958 | Mac Glashan, Jr. et al. | 137/625.69 X |
| 3,951,166 | 4/1976 | Whitener | 137/625.27 |
| 3,955,760 | 5/1976 | Ridenour et al. | 236/86 |
| 3,961,606 | 6/1976 | Wong | 123/41.12 |
| 4,065,052 | 12/1977 | Ridenour | 236/86 |
| 4,128,203 | 12/1978 | Maltby | 236/100 |
| 4,165,035 | 8/1979 | Maltby | 236/100 X |
| 4,176,784 | 12/1979 | Ridenour | 236/86 |

Primary Examiner—William E. Tapolcai, Jr.
Attorney, Agent, or Firm—Ken C. Decker; William N. Antonis

[57] ABSTRACT

A control valve is provided for a fluid-operated clutch. Specifically, the control valve controls fluid to the fluid-operated clutch of a vehicle cooling fan. The control valve disengages the clutch to disconnect the fan from an internal combustion engine of the vehicle when coolant temperature is low and engages the clutch to operate the fan when the coolant temperature rises to a predetermined value. The control valve has a central passage with three bores and a valve spool with three sealing members associated with the bores. Fluid is supplied under pressure to the valve and always acts in opposite directions on two of the sealing members to provide a balanced condition for the valve spool even with fluctuations in the inlet pressure of the fluid. The control valve utilizes a temperature-responsive device to move the valve spool, with the device being readily adjustable to achieve operation at desired coolant temperatures.

10 Claims, 4 Drawing Figures

CONTROL VALVE FOR FLUID-OPERATED CLUTCH

This invention relates to a control valve for a fluid-operated clutch of a vehicle cooling fan.

Thermally-responsive fluid control valves are known in the art for operating cooling fans of vehicles. The control valves supply fluid under pressure to disengage a fluid-operated clutch to disconnect the cooling fan from the internal combustion engine of the vehicle when the cooling fluid temperature is low, to save power and reduce noise. This also enables the temperature level of the coolant to increase more rapidly to operating temperatures. When the temperature of the coolant reaches a predetermined value, the control valve exhausts fluid under pressure from the clutch to engage the fan with the internal combustion engine, thereby causing the fan to rotate.

The present invention provides a control valve for a cooling fan which has a number of advantages over those known in the art. The control valve includes a housing with a central passage having three spaced bores therein. A valve spool moveable in the passage has three sealing members associated with the three bores. A fluid-pressure inlet communicates with the passage between first and second bores and a fluid outlet communicates with the central passage between second and third bores. Beyond the third bore is a vent.

The valve spool has three conditions—one in which fluid can be supplied from the inlet to the outlet and to a fluid-operated clutch connected to the outlet, one in which the second bore is sealed between the inlet and the outlet, and a third in which the second bore remains sealed and the third bore is opened to exhaust fluid from the fluid-operated clutch connected to the valve outlet.

The fluid supplied under pressure to the central passage always acts in opposite directions on two of the sealing members to provide a balanced condition for the valve spool even though the pressure of the fluid supplied thereto fluctuates. The control valve is of small size and compact design with fewer parts and minimal critical machined surfaces in the central passage thereof. There is also a more constant friction factor for the valve spool because at least two O-rings or sealing members are in bores at one time. The control valve utilizes a commercially-available temperature-responsive device to move the valve spool. The temperature-responsive device is mounted for adjustable movement in the housing of the control valve so that the device can be adjusted to achieve operation at desired coolant temperatures.

It is, therefore, a principal object of the invention to provide a control valve for a vehicle cooling fan clutch having the advantages and features discussed above.

Many other objects and advantages of the invention will be apparent from the following detailed description of a preferred embodiment thereof, reference being made to the companying drawings, in which.

Figure 1:
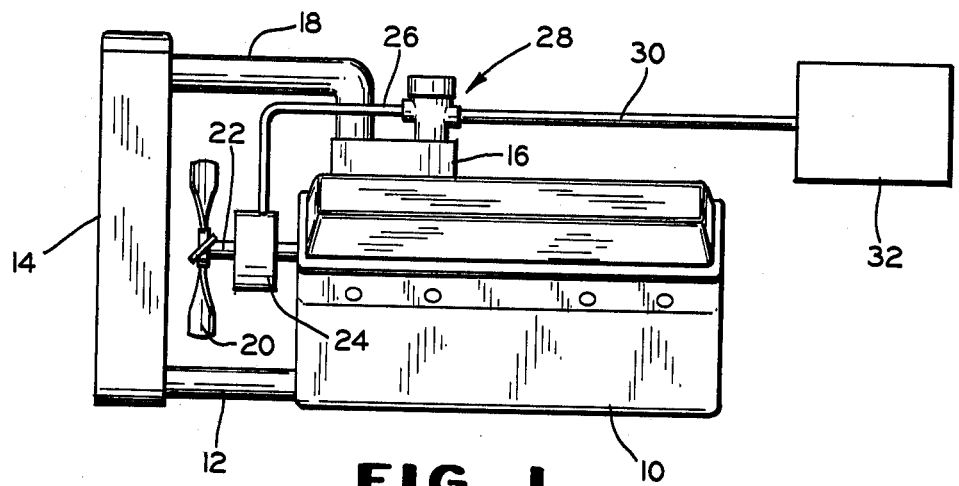
FIG. 1 is an overall, schematic view in elevation of a vehicle cooling system utilizing a control valve in accordance with the invention.

Referring particularly to FIG. 1, an overall vehicle cooling system is schematically shown. An internal combustion engine indicated at 10 receives coolant through an inlet hose 12 from a radiator 14, with the coolant being returned to the radiator through a header 16 and a return hose 18. A cooling fan 20 is mounted on a shaft 22 which is connected to and disconnected from the internal combustion engine 10 by a fluid-operated clutch 24. This clutch can be of the type shown in U.S. Pat. No. 3,985,214, issued Dec. 4, 1974. When the clutch 24 does not receive fluid, the fan 20 is connected to the engine. However, when fluid under pressure is supplied to the clutch 24 through an outlet line 26, the clutch is disengaged and the fan does not rotate. The fluid under pressure in the outlet line 26 is controlled by a control valve 28 in accordance with the invention, with the fluid supplied through a fluid inlet line 30 from a suitable source 32 of fluid under pressure.

When the coolant temperature is below a predetermined value, the fluid under pressure is supplied to the clutch to disengage the fan. Thus, power from the engine is not required to rotate the fan, the noise level is reduced, and the coolant temperature rises to an operating temperature more rapidly. When the temperature rises the control valve shuts off the supply of fluid to the clutch and, when the predetermined temperature is reached, the exhaust in the valve opens to vent the fluid under pressure from the clutch.

The control valve 28 has a main housing 34 with a threaded lower end 36 by means of which the housing can be mounted in the header 16. The housing 34 has a main central passage 38 which includes a first or end bore 40 forming a first valve surface and having a lower threaded end 42. Above the first bore 40, the passage 38 has a second or intermediate bore 44 forming a second valve surface, with a third or exhaust bore 46 thereabove, forming a third valve surface, the three bores preferably being aligned and of the same diameter. An annular recess 48 is formed in the passage 38 between the end and intermediate bores 40 and 44 and a second annular recess 50 is formed in the passage between the intermediate and exhaust bores 44 and 46. With this design, relatively simple machining operations with minimal critical dimensions are required for the valve passage 38.

The valve housing 34 also has a fluid inlet 52 which communicates with the source 32 through the supply line 30 and which also communicates with the recess 48 between the bores 40 and 44 through an opening 54. The housing 34 also has a fluid outlet 56 which communicates with the fan clutch 24 through the line 26 and also communicates with the recess 50 between the bores 44 and 46 through an opening 58.

The valve 28 also includes a valve spool 60 moveable in the central passage 38. The spool 60 includes a lower cylindrical portion 62, an intermediate stem 64, and an upper cylindrical portion 66. The valve spool 60 has a lower elastomeric sealing member or O-ring 68 associated with the end bore 40, an intermediate elastomeric sealing member or O-ring 70 moveable into and out of the intermediate bore 44, and an upper elastomeric sealing member or O-ring 72 moveable into and out of the exhaust bore 46. The valve spool 60 extends through the upper end of the central passage 38 to a reduced end 74 on which is affixed a suitable spring seat 76. A return spring 78 bears against the seat 76 and urges the valve spool 60 downwardly. The upper end of the spring 78 bears against the under side of an end cap 80 having internal threads 82 engaging an upper threaded portion 84 of the valve housing 34. The upper end of the portion 84 has a notch or opening 86 which communicates with a groove 88 extending the length of the housing portion 84 beyond the threads of the cap 80. The notch 86 and the groove 88 provide venting means when the valve spool 60 is moved to an upper condition with the sealing member 72 above the exhaust bore 46.

In order to move the valve spool 60 in the central passage 38, a temperature-responsive device 90, which is commercially available, is employed. The device 90 has a temperature-sensing housing 92 which extends into the interior of the header 16 and senses the temperature of the coolant flowing therethrough. The device 90 also has an upper threaded end 94 which is received in the lower threaded end 42 of the bore 40. Above the threaded end 94, the temperature-responsive device 90 has an actuator rod 96 which engages the lower end of the valve spool 60. The device 90 can readily be adjusted relative to the housing 34 by the extent to which the device is turned into the housing. When the device is in the proper position, a lock nut 98 can be tightened to firmly hold the device in position. To adjust the device 90, it is threaded into the housing and the entire assembly heated to the desired fan-engagement temperature. The device 90 is then adjusted to the open exhaust position of the valve and then locked with the nut 98, with the housing 34 having a sealing ring 100.

Figure 2:
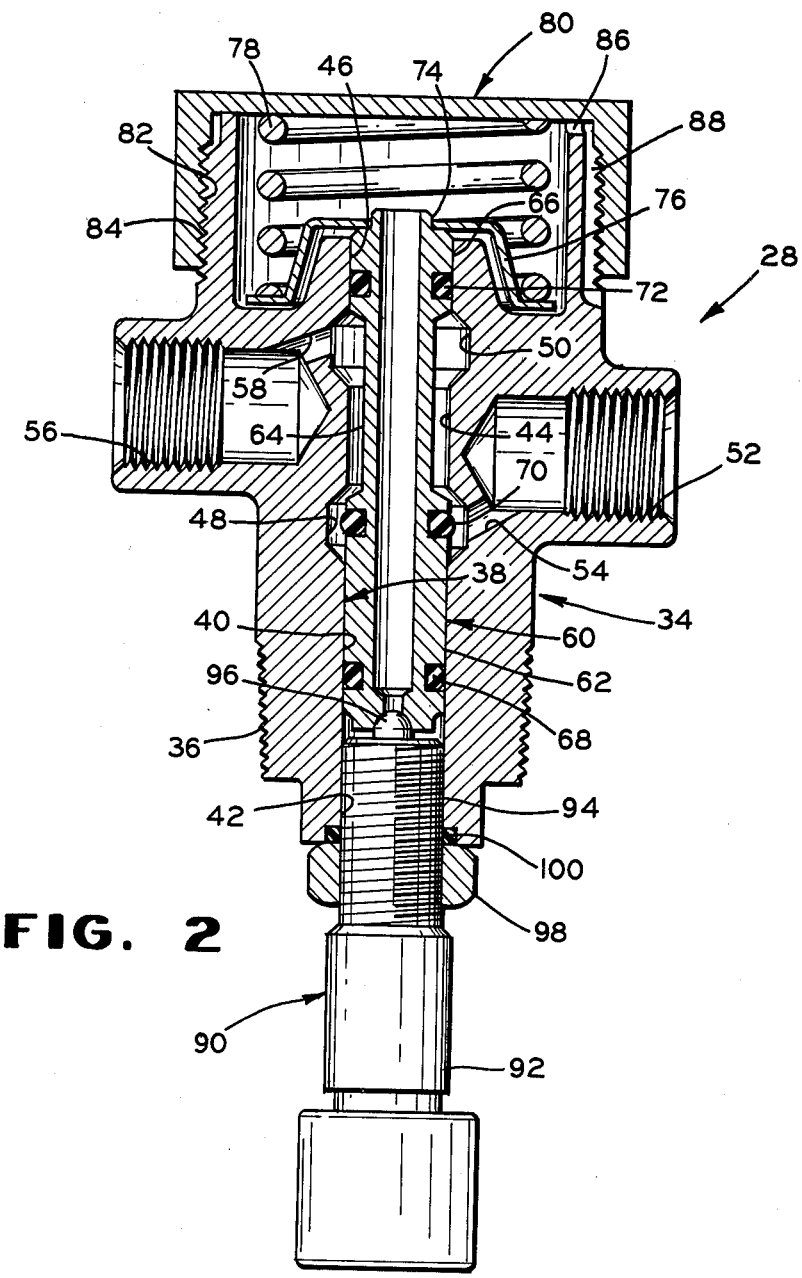
FIG. 2 is a view in longitudinal cross section of the control valve of FIG. 1.
Figure 3:
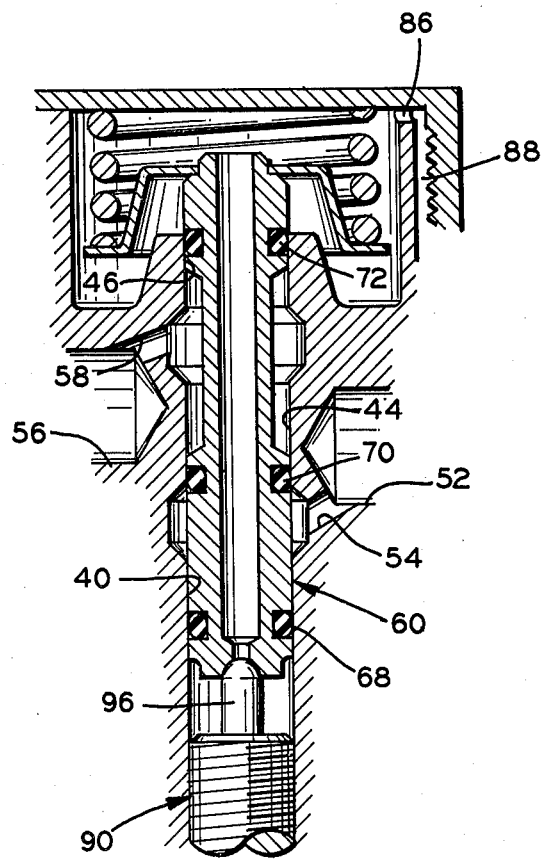
FIGS. 3 and 4 are fragmentary views of the control valve of FIG. 2 with a valve spool being shown in different positions.

In the operation of the control valve 28, the actuator rod 96 of the temperature-responsive device 90 is in its most retracted position, as shown in FIG. 2, with the coolant being at low temperature, the rod being moved by a wax capsule in the portion 92. The valve spool 60 is then in a first condition in which the sealing member 68 is in the first bore 40, the second sealing member 70 is in the recess 48, and the third sealing member 72 is in the exhaust bore 46. Fluid under pressure can then be supplied from the source 32 through the inlet 52, the opening 54, the intermediate bore 44, the opening 58, and the outlet 56. This fluid is then supplied through the line 26 to the fluid-operated clutch 24 which causes the fan 20 to be disengaged from the internal combustion engine 10. With this arrangement, if the source of fluid under pressure should fail, the fan 20 will then be continually engaged so that overheating will not result from such failure.

As the temperature of the coolant rises, the rod 96 extends from the device 90 and the valve spool 60 moves to a second condition. In this condition, the first sealing member 68 remains in the end bore 40, the sealing member 70 now moves into the intermediate bore 44 and the third sealing member 72 remains in the exhaust bore 46. The inlet 52 is then shut off from the outlet 56 but the fluid under pressure is trapped in the clutch 24 and continues to cause the clutch to remain in the disengaged position.

Figure 4:
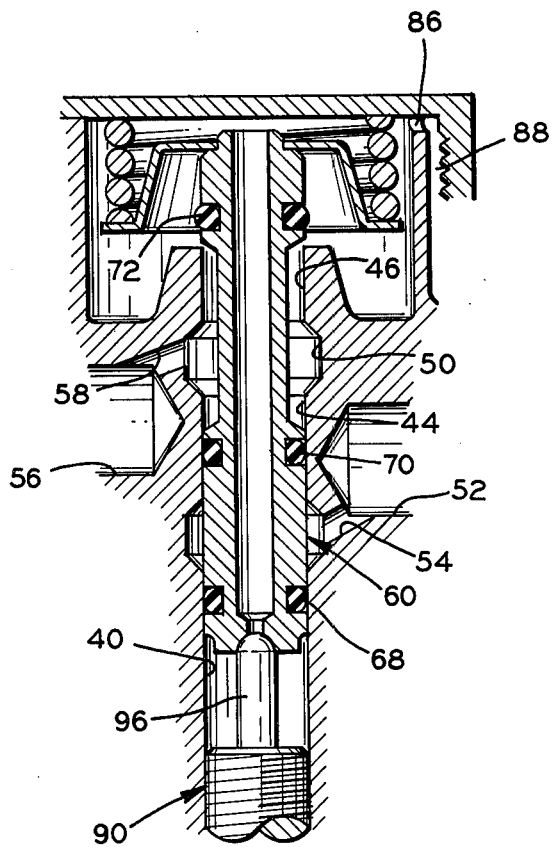

Additional temperature rise of the coolant to a desired value causes the actuator rod 96 to move the valve spool 60 to a third condition of FIG. 4. At this time, the sealing member 68 still remains in the lower end bore 40 to seal that end of the valve, the sealing member 70 remains in the bore 44 to continue to shut off the inlet 52 from the outlet 56, but the sealing member 72 is now beyond the exhaust bore 46. This then enables the fluid under pressure in the clutch 24 to exhaust through the line 26, the outlet 56, the opening 58, the annular recess 50, the bore 46, and the notch 86 to the exhaust groove 88. At this time, the clutch moves to the engaged position and the fan 20 is driven by the engine 10. Actually, the device 90 is designed so that a change in the coolant temperature of only 2° F. will occur between the second and third conditions of the valve spool 60. Of course, as the coolant cools again, the valve spool 60 moves through the three conditions in the opposite direction.

From the above, it will be seen that the control valve 28 has a number of advantages over those heretofore known. The fluid under pressure from the inlet 52 always acts in opposite directions on the sealing members 68 and 70 so that fluctuations in the pressure will not affect the operation of the valve spool 60. The valve 28 is also of small size and of compact design. Further, the cost of the valve is less than those heretofore known since the central passage 38 of the housing 34 can be made by a screw machine operation with only minimal surfaces requiring close dimensions. There are also always at least two of the sealing members in the bores at the same time so as to provide a more constant friction factor.

The valve 28 also enables accurate and easy adjustment of the temperature-responsive device 90 relative to the housing 34 to provide the desired valve spool movements at the desired temperatures. The sealing members or O-rings also provide a self-cleaning action when moving through their relative bores so that no filters are required in the system.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A valve for causing engagement and disengagement of a fluid-actuated clutch in response to the temperature of a fluid which varies according to the engaged or disengaged condition of said clutch, said valve comprising a housing having a central internal passage extending therethrough, said passage having an intermediate bore therein, said housing having an inlet passage communicating with one end of said bore and an outlet passage communicating with the other end of said bore, said central passage having an end bore therein in line with said intermediate bore and communicating with said inlet passage from the side opposite said intermediate bore, said central passage having an exhaust bore communicating with said outlet passage from the side opposite said intermediate bore, a moveable valve spool in said central passage, a first elastomeric sealing member carried by one of said valve spool and said end bore in a first predetermined position, a second elastomeric sealing member carried by one of said valve spool and said intermediate bore in a second predetermined position on one side of said first sealing member, a third elastomeric seal carried by one of said valve spool and said exhaust bore in a third predetermined position on the side of said second sealing member opposite said first sealing member, said valve spool being moveable in said central passage among a first condition in which said third sealing member seals said exhaust bore, said intermediate bore is open, and said first sealing member seals said end bore, a second condition in which said second sealing member seals said intermediate bore, said third sealing member seals said exhaust bore, and said first sealing member seals said end bore, and a third condition in which said second sealing member seals said intermediate bore, said exhaust bore is open, and said first sealing member seals said end bore, temperature-responsive means for moving said spool in one direction in said central passage, and resilient means for urging said spool in the opposite direction in said central passage.

2. A valve according to claim 1 characterized by said first end bore and said intermediate bore being of the same size, with said first sealing member and second sealing member being of the same size.

3. A valve according to claim 1 characterized by said exhaust bore being in line with said end and intermediate bores.

4. A valve according to claim 3 characterized by said three bores being of the same size and said first, second, and third sealing members being of the same size.

5. A valve according to claim 1 characterized by a spring seat mounted on said valve spool outside said housing beyond said exhaust bore, and said resilient means being a coil spring having one end seated on said spring seat.

6. A valve according to claim 5 characterized by a cap mounted on said housing and spaced from said spring seat, the other end of said coil spring being seated against said cap.

7. A valve according to claim 6 characterized by said cap and said housing forming an exhaust passage therebetween for communicating with said exhaust bore when said exhaust bore is open.

8. A valve according to claim 1 characterized by said thermal responsive means being adjustably mounted for longitudinal movement in said housing.

9. A valve according to claim 1 characterized by said central passage having a threaded end beyond said end bore, and said temperature-responsive means having a threaded portion threadedly received in said threaded end of said central passage, whereby said temperature-responsive means can be moved in and out of said central passage to adjust the temperature at which said valve spool is moved.

10. A valve according to claim 9 characterized by said valve housing having a sealing ring at the threaded end and a lock nut mounted on said temperature-responsive means for affixing said temperature-responsive means in a predetermined position relative to said housing.

* * * * *